United States Patent [19]

Wiley

[11] 4,100,237
[45] Jul. 11, 1978

[54] CO-EXTRUSION OF ABS/POLYSTYRENE MULTIPLE-LAYERED SHEETING

[75] Inventor: Donald F. Wiley, Tempe, Ariz.

[73] Assignee: Cosden Technology, Inc., Big Spring, Tex.

[21] Appl. No.: 752,619

[22] Filed: Dec. 20, 1976

Related U.S. Application Data

[63] Continuation-in-part of Ser. No. 519,682, Oct. 31, 1974, abandoned, which is a continuation-in-part of Ser. No. 368,834, Jun. 11, 1973, abandoned, which is a continuation of Ser. No. 128,940, Mar. 29, 1971, abandoned.

[51] Int. Cl.² .................................................. B29F 3/10
[52] U.S. Cl. .............................. 264/40.6; 156/244.11; 264/171; 428/500; 428/515
[58] Field of Search ....................... 264/171, 173, 40.7, 264/40.6, 40.1; 428/500, 332–335, 515; 156/244

[56] References Cited

U.S. PATENT DOCUMENTS

| | | | |
|---|---|---|---|
| 3,476,627 | 11/1969 | Squires | 264/171 |
| 3,524,795 | 8/1970 | Peterson | 264/171 |
| 3,589,976 | 6/1971 | Erb | 264/171 |
| 3,769,380 | 10/1973 | Wiley | 264/171 |
| 3,798,103 | 3/1974 | Gaunt | 156/244 |
| 3,823,211 | 7/1974 | Colombo | 264/173 |
| 3,833,704 | 9/1974 | Nissel | 264/171 |
| 3,882,219 | 5/1975 | Wiley | 264/171 |

*Primary Examiner*—Jeffery R. Thurlow

[57] ABSTRACT

A process is disclosed for producing composite sheeting of polystyrene having a thin protective layer of ABS polymer. The process comprises joining a molten stream of each polymeric material in a single extruder discharge conduit such that there is produced a single molten stream having a reasonably well defined interface between the two types of polymeric material, and thereafter, passing the resulting single stream of material through a sheet-form extrusion die having its die lips generally aligned with the foregoing interface.

10 Claims, 4 Drawing Figures

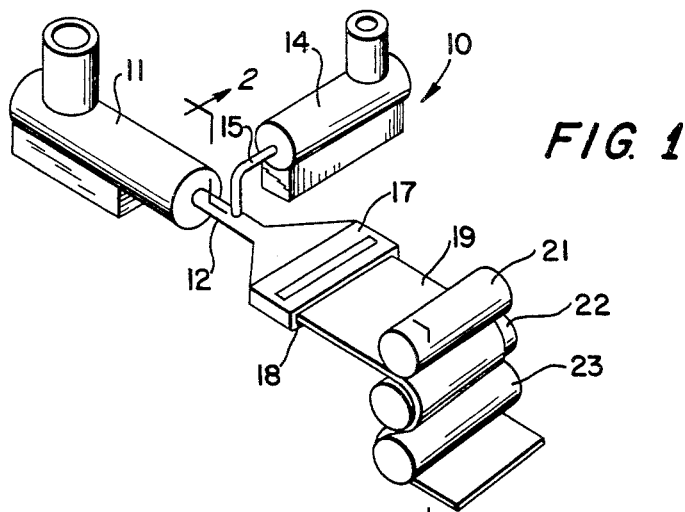
FIG. 1
FIG. 2
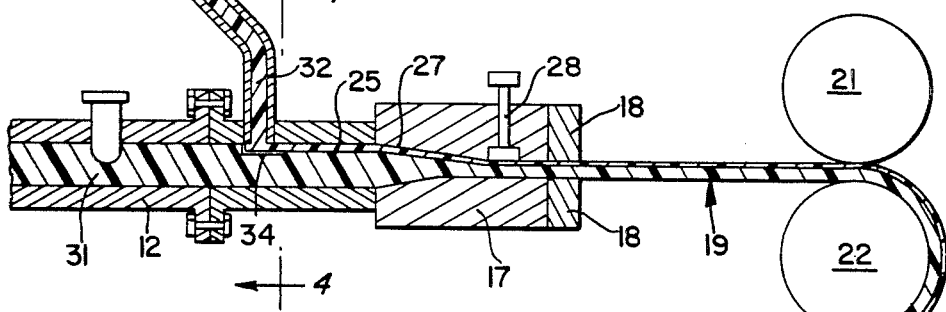
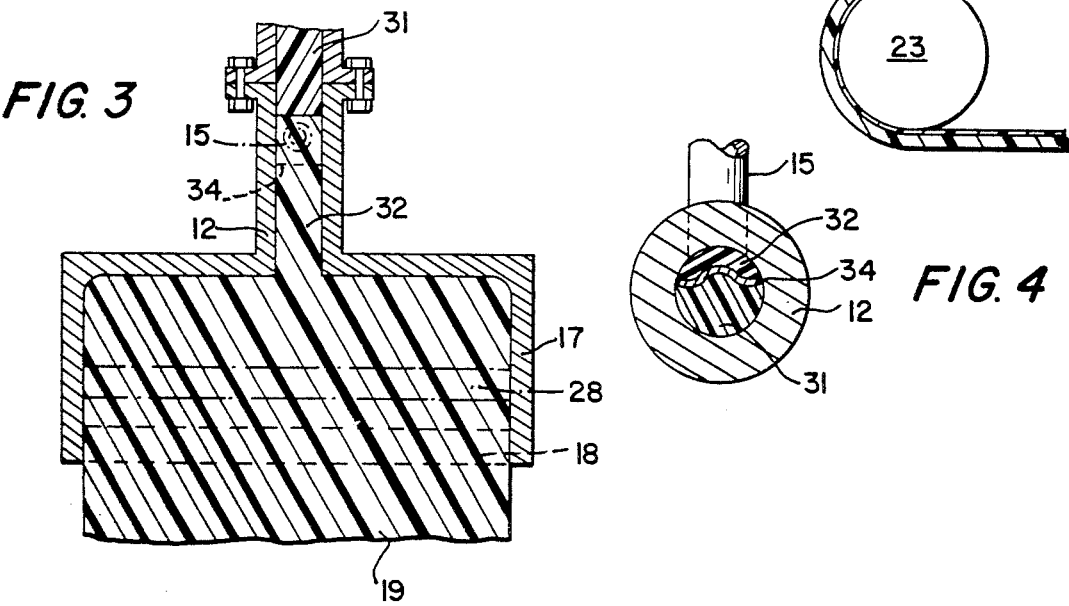
FIG. 3
FIG. 4

CO-EXTRUSION OF ABS/POLYSTYRENE MULTIPLE-LAYERED SHEETING

CROSS REFERENCE TO RELATED APPLICATIONS

This is a continuation-in-part of copending application Ser. No. 519,682 filed Oct. 31, 1974, now abandoned, which is a continuation-in-part of copending application Ser. No. 368,834 filed June 11, 1973, now abandoned, which in turn is a continuation of copending application Ser. No. 128,940, filed Mar. 29, 1971 and also now abandoned.

BACKGROUND OF THE INVENTION

This invention relates to the production of multiple-layer sheeting, and more especially, to the extrusion of polystyrene sheeting having a thin protective layer of ABS polymer.

Co-extrusion processes for the production of multi-layer sheeting are of course well known in the art; however, hitherto known processes almost exclusively employ some form of encapsulation technique wherein one stream of thermoplastic material, typically the volumetrically smaller stream, is completely surrounded, e.g., coaxially, by a second stream of such material prior to passing the entire composite stream through an extrusion die. Alternatively, the foregoing encapsulation may be effected in the cavity-portion of an extrusion die. In both types of process, the resultant sheeting product is characterized by an inner-layer of one type of thermoplastic material sandwiched between or encapsulated by two exterior layers of a second thermoplastic material.

Very little success, with one possible exception, has been recorded in the area of co-extrusion of multiple thermoplastic resinous layers merely laminated on top of one another. Most attempts have employed a series of extrusion dies whereby two distinct sheets of different material are first formed by extrusion, superimposed upon one another and then passed through yet another extrusion die or other restrictive orifice. In other attempts, there are employed complex extrusion dies wherein individual molten streams of thermoplastic material are superimposed upon one another in the die cavity immediately before passing through the die lips.

The possible exception referred to hereinabove relates to U.S. Pat. No. 3,476,627 which discloses a process comprising combining two streams of molten thermoplastic resin in a conduit upstream of an extrusion die such that they have a sharply defined juncture plane, and thereafter passing the composite stream through an extrusion die in such a manner that the juncture plane is parallel to the principle direction of flow of the resin as it takes on the shape of sheeting. The foregoing disclosure is concerned primarily with the co-extrusion of multiple-layered polyvinyl butyral resin. This patent does, however, refer broadly to a process for co-extruding multiple-layered sheeting of different thermoplastic resins having similar processing characteristics and which will adhere to one another, and further limited by the requirement that the volume of a given resin component be at least 25% of the total resin content.

In contrast, this invention is concerned with the production of multiple layered sheeting of two materials which have different processing characteristics, which are highly incompatible and which have hitherto defied attempts both through co-extrusion techniques and conventional laminating methods to produce a strongly adhering bond therebetween. Prior attempts aimed at co-extrusion of such materials have resulted in multilayered products wherein the individual layers are rather easily peeled from one another, and like attempts to laminate materials of this nature by extruding a molten layer of one polymer onto a preformed sheet of a second polymer have provided similar unsatisfactory results. Moreover, the invention relates to multilayered sheeting consisting primarily of a less expensive material, i.e., polystyrene, and having only a very thin surface layer or veneer of a second, more expensive polymeric material having highly desirable surface characteristics, i.e., ABS polymer.

In grandparent application Ser. No. 368,834, there is described a process for overcoming the problems of prior art and producing a suitable polystyrene/ABS multiple layered sheeting product, however, it has been discovered that not even all ABS polymers may be successfully co-extruded in accordance with the there-disclosed process to provide a multi-layered product wherein sufficient bond strength was exhibited between polystyrene and ABS layers. Even ABS polymers having similar processing characteristics, such as melt index, were unpredictable insofar as the production of bond strength to polystyrene is concerned. There was known no means by which to predict whether or not a given ABS would sufficiently bond to the polystyrene under co-extrusion conditions. In parent co-pending application Ser. No. 519,682, a definition was presented for ABS polymers which could be successfully bonded to a polystyrene substrate by co-extrusion techniques; however, because the phenomenon is so unpredictable, further refinement is required in this definition to prevent the possibility that it unintentionally encompass isolated ABS compositions which do not satisfactorily bond to polystyrene in the claimed process.

SUMMARY OF THE INVENTION

It is therefore a primary object of the invention to provide a process for producing in a single extrusion step multiple-layered sheeting from two or more normally incompatible polymeric materials.

A further object of the invention resides in providing a method for producing multilayer sheeting having a major thickness of a less expensive polymeric material and a relatively thin surface layer of a more expensive polymeric material which exhibits highly desirable surface characteristics.

A specific object of the invention lies in the production of a multiple-layered sheet comprised primarily of polystyrene and having a protective surface layer of ABS polymer.

Yet another object of the invention resides in the vision of a process for the production of a multiple-layered sheet comprised of a base layer of polystyrene and a thin surface layer of an ABS polymer which is capable of firmly bonding to the polystyrene base layer.

Other objects, features and advantages of this invention will become apparent from the description which follows, when considered in view of the accompanying drawings.

Thus, in accomplishing the foregoing objectives, there is provided according to the invention a process for producing composite sheeting of polystyrene having a relatively thin protective layer of ABS polymer. The process comprises joining a heat plastified stream of polystyrene and a heat plastified stream of ABS in an extruder discharge conduit to form a single stratified stream of heat plastified material conforming to the cross-section of the conduit and having a relatively sharply defined interface between the polystyrene and ABS, and thereafter passing this stratified stream through a sheet-form extrusion die having its die lips generally aligned with the foregoing interface. Firm adherence between the polystyrene and ABS layers is achieved by providing at the junction point of the two polymeric streams that the melt viscosity of the ABS be relatively close to that of the polystyrene, and advantageously nearly identical thereto. It is also necessary to provide an ABS polymer which possesses a bonding factor of between about 0.9 and 1.1 with respect to the substrate polystyrene, with the bonding factor defined as $$BF_c = [A(15.4) + B(8.6) + S(9.1)]$$

wherein $A$, $B$ and $S$ represent the respective percentages of acrylonitrile, butadiene and styrene in the ABS and $\delta_S$ is the Hildebrand solubility parameter for the substrate polystyrene.

It is also necessary that A be less than about 0.4S in the foregoing definition preferably less than 0.3S. In this process, the relative proportion of ABS polymer is preferably less than about 20% by volume based upon the total polymeric material. Important operating parameters include the temperature at which each polymer material exits from the extruder and also the temperature of the extrusion die.

BRIEF DESCRIPTION OF THE DRAWINGS

FIG. 1 schematically represents an apparatus for the preparation of a multiple-layered sheet or film employing the method of the invention.

FIG. 2 is a cross-sectional view taken along the line 2—2 in FIG. 1.

FIG. 3 is a top view, in section, of the extrusion die and lead-in conduit portion of the apparatus illustrated in FIG. 1.

FIG. 4 is a cross-sectional view taken along the line 4—4 in FIG. 2.

DETAILED DESCRIPTION OF THE INVENTION

In accordance with this invention it has been discovered that a multiple-layered sheet or film may be produced from two polymeric materials which have hitherto been found extremely difficult to unite by conventional extrusion techniques or by post extrusion laminating procedures. Specifically, the sheeting or film of the invention consists of a layer of polystyrene having a thickness substantially corresponding to the final composite sheeting thickness desired, and adhered to either one or both sides of the polystyrene layer, a relatively thin exterior layer of ABS polymer. Thus, there is provided a composite sheeting having the desirable economic characteristics of polystyrene and concurrently possessing the highly desirable surface properties of ABS polymers. Such stock material characterized by a chemically resistant surface layer of ABS is well suited for fabrication of refrigerator door liners, butter tubs and other containers for fatty or oily foods.

An important aspect of the invention resides in the discovery that an essentially uniform and relatively thin layer of ABS may be firmly united to the polystyrene sublayer in a single extrusion step. Although similar extrusion processes are known in the art, as evidenced by the above-mentioned U.S. patent, the same relate to extrusion of chemically similar or at least compatible resinous materials, whereas the process of this invention has been successfully applied to chemically and physically dissimlar resins. Specifically, it has been discovered that polystyrene and ABS can be co-extruded to produce a multilayered sheet exhibiting suitably strong adhesion between ABS and polystyrene layers if several very important criteria are observed. First, there must be chosen an ABS polymer which has a melt viscosity relatively approximate to that of the polystyrene chosen for the substrate, or alternatively an ABS polymer having a melt viscosity which may be adjusted, as for example, by sufficiently raising the temperature of the polymer during processing, to a value approximating the melt viscosity of the polystyrene. While it is not possible to put precise limits on the degree of similarity required between the respective melt viscosities of the polymeric materials, and although there perhaps will be some degree of unpredictability between particular polymers falling within any broad characterization, in general, satisfactory results are achieved in accordance with the invention if the melt viscosity of the ABS is within the range of about 50 to 150% of that exhibited by the polystyrene. These relative values are only important under actual co-extrusion conditions since in most instances ABS polymer which differ from polystyrene in melt viscosity under standard test conditions by more than the above range can be modified under processing conditions to adjust the melt viscosity into suitable proximity to that of the polystyrene sublayer material. To illustrate the relationship between relative melt viscosity and adherence of ABS and polystyrene layers, the following comparative results are presented for two representative co-extruded sheets:

| | Melt Viscosity Values | | |
|---|---|---|---|
| Polymers | Melt Flow Rate By Extrusion Plastometer (A.S.T.M. D-1238-63T) Condition G (Gms./10 minutes) | Brabender Torque (10 min.) Meter-Grams | Adherence |
| 1. ABS - Dow Chemical Co. - White-230 | 2.20 | 420 | |
| Polystyrene Cosden Oil and Chemical Co. - Impact 825D pellets | 2.0 – 3.0 | 370 | Good |
| 2. ABS - Marbon Division of Borg-Warner Corp. GSE 2502 | 0.50 | 780 | |
| Polystyrene Cosden Oil and Chemical Co. - Impact 825D pellets | 2.0 – 3.0 | 370 | Poor |

The second important criterion involves the selection of an ABS polymer which possesses an inherent bonding compatibility with the styrene polymer utilized for the substrate layer. This ability to bond to polystyrene as a further property of the ABS separate from the melt index criterion discussed above, although not completely independent, that is, two different ABS polymers may exhibit nearly identical melt index characteristics, and yet one of the polymers may bond very strongly with polystyrene whereas the other ABS will produce little or no bond with the polystyrene. This was an extremely troublesome problem, since there was no way of predictably choosing a suitable ABS material for producing a polystyrene/ABS multiple layered product having the requisite bond between layers.

Insofar as the question of what constitutes a sufficient bonding strength is concerned, it should be noted that this is a somewhat relative standard, as a bond strength sufficient for one purpose may not suffice for other purposes. For example, bond strength is not such an important criterion where the respective layers are each relatively thick, i.e., 10 mils or more, since there is less tendency for one of the layers to be peeled off of the other. This is particularly true where the multi-layered sheet product is thermoformed subsequent to formation because the resulting deformations in the article provide a certain degree of interlocking between individual layers. On the other hand, the problem of bond strength becomes of paramount importance when one or more layers, especially those at the surface are very thin. Any manipulation or abuse of such a multiple layered product causes stresses in the thin layers which can result in localized or total delamination. It must also be appreciated that certain specific utilities damand a higher bond strength than others. For example, where a multiple layered product is to be used to form a peelable cover or label is attached, it is apparent that the delamination resistance between the respective layers of the sheet must be greater than the resistance of the bond between the cover label and the container.

For the purposes of the present invention, suitable bonding strength between the polystyrene and ABS layers is considered to be a strength of at least about 1 inch lb. The most useful products are those exhibiting a bond of at least about 3 inch lbs., whereas superior products are those having a bond of between 7 and 10 inch lbs. or more. It is difficult to measure values above 10 inch lbs. since the layers become practically inseparable.

In order to define with predictability which ABS resins may be co-extruded in accordance with the invention to provide multiple-layered products exhibiting a suitable bonding strength between polystyrene and ABS layers, there has been defined a bonding factor for the particular polystyrene/ABS resin pair co-extruded. This bonding factor ($BF_c$) is defined as follows:

$$BF_c = [A(15.4) + B(8.6) + S(9.1)]/\delta_S$$

wherein $A$, $B$ and $C$ respectively designate the percentage of acrylonitrile, butadiene and styrene in an ABS polymer and $\delta_S$ represents the Hildebrand solubility parameter for the substrate styrene polymer. To achieve an optimum bond strength, the factor $BF_c$ is most preferably about 1, whereas suitable bond strength levels may be achieved with a bonding factor ranging between about 0.9 and 1.15, or more preferably between about 0.95 and 1.1. Where additional polymerized components are present in an ABS composition, the above definition can be modified to more accurately characterize the resin, e.g., where a small amount of methylmethacrylate is present, an additional component of MMA(9.5) may be included in the numerator, however, the amount of any such additional components is usually so small as to be negligible in the formula given above. Furthermore, suitable ABS compositions are those characterized by a ratio of weight percent acrylonitrile to weight percent styrene of less than about 0.4, preferably less than about 0.3 and ideally less than about 0.215. In other words, A should be less than 0.25 in the above definition. Of course, it is to be understood that the above relationship holds true only for ABS polymers which do not contain any additional or blended ingredients which would materially affect the basic properties of the ABS polymer, e.g., external lubricants or the like.

The fact that a strongly adhering multiple-layer sheeting can be obtained from ABS and polystyrene in accordance with the foregoing discovery is indeed surprising, since other polymeric materials normally incompatible with polystyrene, such as polyolefins, cannot be co-extruded with polystyrene to yield a satisfactorily adhering multilayered product regardless of the proximity achieved between melt viscosities of the two polymers. The degree of predictability provided by the invention as between various ABS polymers is likewise a surprising and advantageous result.

In another important aspect, the present extrusion process has been found operable to produce multi-layered sheeting having extremely thin surface layers of ABS, e.g., on the order of 1 mil or less, in comparison to the total sheet thickness, e.g., 10 to 12 mils. This is achieved by providing relative feed rates of the polystyrene and ABS such that the volume of ABS generally does not exceed about 25%, and preferably is less than about 20% of the total resin feed. Relative feed rates for the ABS of less than about 15% are, typically, preferred even more. This is in direct contradistinction to the prior art which discloses operability only above a minimum resin content for any given resin component of at least 25% by volume. It is the combination of these very thin surface layers with excellent bonding characteristics which especially distinguishes the present invention.

The principles of the invention are generally applicable to the manufacture of either multilayer polymeric "film" (less than 10 mils in thickness) or "sheeting" (10 mils or thicker); however, polystyrene based film has not found widespread popularity because of the difficulties enocuntered in adapting this material to blown film apparatus conventionally employed together with extrusion equipment in the manufacture of film products. Thus, broadly speaking, it is possible to produce a composite film having a 1 mil or thinner surface layer of ABS on a 4 or 5 mil, or even a 1 mil base layer of polystyrene. But practially speaking, the products of most interest are multilayer sheets of from 10 mils up to ⅛ inch in thickness having ABS surface layers measuring from a fraction, e.g., ¼ or ½ mil, to several mils. Accordingly, it will be appreciated that volumetric feed rates for the ABS component are frequently very small, e.g., less than 1% when sheeting having a very thin surface layer of ABS is desired, and likewise that rates in excess of 20% or 25% are also contemplated when sheeting having a thicker surface layer of ABS is produced.

Referring now to the drawings, in FIG. 1 there is schematically illustrated an apparatus, generally designated by the reference numeral 10, particularly adapted for the process of the invention. The apparatus 10 comprises in cooperative combination a first extruder 11 for the extrusion of molten polystyrene, and connected thereto, a discharge conduit 12. A second extruder 14 having a discharge conduit 15 is adapted for providing a minor stream of molten ABS. Conduit 15 terminates at conduit 12 at a point upstream of the sheeting die 17 which is in operative communication with conduit 12 and receives the flow therefrom. Sheet 19 is formed at the die lips 18 and thereafter carried from the die by means of polished cooling rollers 21, 22 and 23.

In FIG. 2 there is illustrated a sectional view of the discharge conduits 12 and 15, extrusion die 17 and cooling roller arrangement 21, 22 and 23. This view illustrates the intersection of conduits 12 and 15, and the configuration of the polystyrene resin 31 and ABS resin 32 as they are combined in conduit 12 to form stratified stream having an interfacial juncture plane 25. Stratification at the intersection point of the two resins is aided by metal plate 34 positioned in conduit 12 adjacent the entry point of co-extruder discharge conduit 15. Similarly, there is illustrated the passage of the stratified resin stream into the die manifold 27, past restrictor bar 28 and ultimately through the extruder die lips 18 to the chrome or cooling roller assembly. Throughout this entire traversal of the extrusion equipment, it is noted that the individual layers of resinous material maintain their stratified relationship, despite the minute proportion of ABS, to form a final product having an essentially uniform surface layer of this material.

In FIG. 3 is illustrayed a top view of the conduit 12 and extrusion die 17 to demonstrate the lateral flow pattern of molten polymeric material as it passes into and through the extrusion die. FIG. 4 illustrates more clearly the preferred configuration of metal plate 34 positioned in conduit 12.

To produce a multi-layered sheet or film having a satisfactory degree of adherence between layers, it is necessary to observe certain process limitations during the extrusion procedure. While it is of course desirable to provide relatively steady flow of polystyrene and ABS through the apparatus and to avoid any turbulence therein, these limitations are rather typical in most extrusion processes employing highly viscous synthetic resins. More important limitations (although not wholly unrelated to the foregoing) reside in the extrusion temperatures for the polystyrene and ABS, and the temperature maintained in the extrusion die. The extrusion of the polystyrene from extruder 11 into conduit 12 should be carried out at a temperature of from about 400° F. to about 500° F., whereas the ABS should be discharged from extruder 14 at a temperature of from about 430° F. to about 550° F. The role of the latter range will be appreciated in view of the foregoing comments relative to the desired melt viscosity of the ABS at the time of co-extrusion. Hence, this range is not intended to be an absolute limitation of the invention, but rather indicates only the median range wherein the melt viscosity of ABS resins may be rendered proximate to the melt viscosity of polystyrene so as to provide strong adherence between layers in the extruded sheet. It is to be understood that the invention would likewise embody within its scope the use of ABS resins which might be extruded at even higher temperatures to produce satisfactory adherence to the polystyrene substrate co-extrudate.

As indicated, die temperature is also an important process variable, but not from the standpoint of layer adherence to one another. Instead, this parameter affects the surface characteristics, e.g., gloss, etc., of the extruded sheet. Die temperature should be maintained relatively constant during extrusion, with typical values thereof for co-extrusion of ABS and polystyrene ranging between about 400° and 550° F. The best surface gloss is attained with temperatures about 500° F. plus or minus 25° F.

In the co-extrusion of polystyrene and ABS the conditions maintained at the cooling roller assembly also affect the surface properties of the final product. The manufacture of smooth sheeting normally requires the use of highly polished rollers, e.g., chrome, typically three in number, each being approximately 12 inches in diameter and being adapted for internal circulation of cooling water. When ABS is co-extruded as a surface layer, however, it has been found that a slightly higher than normal top roll temperature, e.g., 140°-175° F., as well as a lower than normal top roll pressure, e.g., approximately enough to overcome upward spring tension on the rollers, are required to achieve optimum surface characteristics, especially gloss.

Other processing variables or lesser importance include the pressures at which the polystyrene and ABS are separately extruded before combination. These pressures are of little significance and typically fall within the range of 750 and 3000 p.s.i. for the polystyrene stream and similarly between about 2500 and 4500 p.s.i. for the ABS stream. Of course, the downstream pressure at the point where the streams intersect is equal in both streams.

The term polystyrene as employed herein includes both homopolymers of styrene and copolymers of styrene with other polymerizable and polymerized monomers. Included within the latter category are impact polystyrenes which comprise graft copolymers of styrene upon conjugated diene backbone polymers such polybutadiene, butadiene-styrene copolymers, butadiene acrylonitrile copolymers, natural rubber, etc. Likewise included in this category are normal copolymers of styrene with minor amounts of other well known, conventional monomers.

Similarly, the term ABS is to be interpreted in its broadest sense to characterize the now well known class of graft copolymers containing acrylonitrile, butadiene and styrene monomers. A multitude of ABS products are available commercially. Suitable ABS resins for use in the process of the invention may easily be ascertained by one of ordinary skill in the art from molecular weight, melt index and/or melt viscosity data characterizing any given resin, together with a calculation of the bonding factor with respect to the polystrene chosen for the substrate layer.

It will be appreciated that multilayer sheeting having a surface layer of ABS on both sides of the polystyrene layer may be formed according to the principles of the invention. Such an embodiment merely requires that various minor modifications be made in the physical equipment employed to carry out the process. Likewise, it will be appreciated that various types of extrusion dies may be substituted for the one presently illustrated, e.g., end-fed die.

The following specific example is provided to facilitate a better understanding of the invention, it being understood that the same is intended to be merely illustrative and in no wise limitative.

EXAMPLE

A main resin stream of impact polystyrene (Cosden Oil & Chemical Co. 825D pellets) is extruded from a 4½ inch diameter two stage vented extruder containing a 4:1 compression ratio screw. A 1¼ inch diameter 24:1 single stage side extruder also having a 4:1 compression ratio screw is arranged as illustrated in FIGS. 1 and 2 and supplies a second stream of ABS resin (Dow Chemical Co. — White 230, Melt Flow Rate by Extrusion Plastometer (A.S.T.M. D-1238-63T) condition G 2.20 grams/10 min.; Brabender Torque 420 meter-grams (10 min.). The polystyrene is extruded at a temperature of 440° F. and a feed rate of approximately 680 lbs./hr. The ABS side stream is discharged from the 1¼ inch extruder at 505° F. and at a feed rate of approximately 30 lbs./hr.

The two resinous streams are then combined in the discharge conduit of the 4½ diameter extruder utilizing a baffle plate arrangement illustrated in FIG. 4. There results a single stratified bi-component stream having a horizontal juncture plane between the polystyrene and ABS. The bi-component stream is conducted to a center-fed sheet-form extrusion die which opens to an extrusion slit 37 inches wide with its lips set at approximately 59 mils. The die temperature averages about 480° F.

Upon leaving the die lips, the extruded sheet passes through a series of three 12 inch polished chrome cooling rolls, the top roll maintained at 140° F., middle roll at 160° F. and bottom roll at 105° F. Roll pressures at top and bottom are maintained at approximately 20 p.s.i. at a gap setting of 52 mils. The polishing and subsequent rubber rolls are operated at about 8% excess speed to stretch the extruded sheet to a final thickness of 55 mils.

Examination of the final sheeting product evidences an essentially uniform layer of ABS approximately 2½ mils thick firmly adhered to the impact polystyrene base layer. This thickness corresponds closely with the relative feed rates for the two resins, i.e., approximately 4.4%.

The foregoing co-extrusion procedure is carried out for a number of commercially available ABS products, and the correlation of bonding strength and bonding factor for each ABS material is summarized in the following table:

TABLE 1

| ABS | BONDING FACTOR (BF$_c$) | RATIO A:S | BOND STRENGTH (IN-LB) |
|---|---|---|---|
| Resin A | 1.01 | .214 | 10 |
| Resin B | 1.09 | .183 | 10 |
| Resin C | 1.09 | .250 | 9 |
| Resin D | 1.11 | .262 | 7 |
| Resin E | 1.13 | .359 | 4 |
| Resin F | 1.13 | .290 | 3 |
| Resin G | 1.15 | .379 | 1 |
| Resin H | 1.15 | .446 | 1 |

As an example of the distinction between bonding factor and melt index, Resin C has a value of 0.42 grams/10 min. under A.S.T.M. conditions, whereas Resin H has a value of 1.70 grams/10 min. under the same conditions.

Thus, there has been provided according to the invention a process for co-extruding multi-layered sheeting of polystyrene and ABS wherein at least one ABS layer is firmly adhered to the polystyrene base layer. Moreover, the subject process enables the production of multi-layered film or sheeting of polystyrene having very thin, e.g., less than 1 mil, surface layers of ABS.

While the fundamental novel features and advantages of the invention have been pointed out in connection with a single illustrated embodiment thereof, it will be appreciated that various obvious modifications of the co-extrusion process will suggest themselves to one of ordinary skill in the art. Therefore, it is intended to be limited only by the scope of the following claims.

What is claimed is:

1. A process for the manufacture of composite sheeting having a major layer corresponding substantially to the final composite sheeting thickness of a styrene polymer selected from the group consisting of homopolystyrene, impact polystyrene and normal copolymers of styrene containing a minor amount of another copolymerizable monomer, and a minor layer constituting less than 20% of the total final thickness of an ABS polymer firmly united to the exterior surface of said major layer, comprising conveying a heat plasticized stream of said styrene polymer in a conduit, joining to the exterior surface of said styrene polymer stream within the said conduit a second, heat plasticized stream of said ABS polymer, said ABS polymer being characterized by a bonding factor (BF$_c$) of between about 0.9 and 1.15, wherein said bonding factor is defined as $$BF_c = [A(15.4) + B(8.6) + S(9.1)]\delta_S$$

wherein $A$, $B$ and $C$ are the respective percentages of acrylonitrile, butadiene and styrene in said ABS polymer, $\delta_S$ is the Hildebrand solubility parameter for said styrene polymer and $A$ is less than about 0.45, said second stream constituting less than about 20% by volume of the combined first and second streams thereby forming a single stratified stream of heat plasticized material conforming to the cross section of said conduit and being characterized by distinct, contiguous layers of said polymeric materials having a relatively sharply defined interface therebetween, said interface terminating at each end at a point on the inside surface of said conduit, adjusting the temperature of said stream of ABS to a temperature at which the melt viscosity of the ABS polymer stream exhibits a value within the range of about 50% to 150% of the melt viscosity exhibited by said styrene polymer stream under the conditions of the extrusion process, conveying said composite stream undisturbed through said conduit to a sheet-form extrusion die having its die lips generally aligned in parallel with the said interface between the two polymeric materials, and passing said composite stream of molten material through the said die to form a sheet, whereby said second stream spreads laterally across said first stream inside of said extrusion die thereby forming said minor layer of said composite sheeting.

2. The process as defined by claim 1, wherein said styrene polymer is homopolystyrene.

3. The process as defined in claim 1, wherein the relative proportion of ABS polymer is less than about 15% based upon the total polymeric material.

4. The process as defined by claim 1, wherein said conduit has a generally circular cross-section and said interface has a generally arcuate shape with its arc of curvature being concave in the direction of the ABS polymer stream.

5. The process as defined in claim 1, wherein the heat plastified stream of ABS polymer is extruded at a temperature of from about 430° F. to about 550° F. and the heat plastified stream of polystyrene is extruded at a temperature of from about 400° F. to about 500° F.

6. The process as defined by claim 5, wherein the extrusion die is maintained at a temperature of from about 400° F. to about 550° F.

7. The process as defined by claim 1, wherein said bonding factor is between about 0.95 and 1.1.

8. The process as defined by claim 1, wherein said bonding factor is approximately 1.

9. The process as defined by claim 1, wherein A is less than about 0.3S.

10. The process as defined by claim 9, wherein A is less than about 0.25S.

* * * * *